US012676254B2

(12) United States Patent
Koda et al.

(10) Patent No.: US 12,676,254 B2
(45) Date of Patent: Jul. 7, 2026

(54) R-T-B BASED PERMANENT MAGNET

(71) Applicant: TDK CORPORATION, Tokyo (JP)

(72) Inventors: Atsushi Koda, Tokyo (JP); Takahiro Suwa, Tokyo (JP); Hikaru Kudo, Tokyo (JP)

(73) Assignee: TDK CORPORATION, Tokyo (JP)

( * ) Notice: Subject to any disclaimer, the term of this patent is extended or adjusted under 35 U.S.C. 154(b) by 449 days.

(21) Appl. No.: 18/266,007

(22) PCT Filed: Nov. 10, 2021

(86) PCT No.: PCT/JP2021/041373
§ 371 (c)(1),
(2) Date: Jun. 8, 2023

(87) PCT Pub. No.: WO2022/123990
PCT Pub. Date: Jun. 16, 2022

(65) Prior Publication Data

US 2024/0105368 A1 Mar. 28, 2024

(30) Foreign Application Priority Data

Dec. 9, 2020 (JP) ................................ 2020-204540

(51) Int. Cl.
*H01F 1/057* (2006.01)
*B22F 3/16* (2006.01)
(Continued)

(52) U.S. Cl.
CPC .............. *H01F 1/0571* (2013.01); *B22F 3/16* (2013.01); *B22F 3/24* (2013.01); *B22F 9/023* (2013.01); *B22F 9/04* (2013.01); *C22C 38/002* (2013.01); *C22C 38/005* (2013.01); *C22C 38/06* (2013.01); *C22C 38/10* (2013.01); *C22C 38/14* (2013.01); *C22C 38/16* (2013.01); *B22F 2003/248* (2013.01); *B22F 2009/044* (2013.01); *B22F 2201/02* (2013.01); *B22F 2202/05* (2013.01); *B22F 2301/355* (2013.01);
(Continued)

(58) Field of Classification Search
None
See application file for complete search history.

(56) References Cited

U.S. PATENT DOCUMENTS

2015/0132178 A1* 5/2015 Suzuki .................. C22C 38/002
420/83
2016/0307675 A1* 10/2016 Tada ..................... H01F 1/0577

FOREIGN PATENT DOCUMENTS

JP 2018-174323 A 11/2018

OTHER PUBLICATIONS

Mahine translation of JP2018174323A (Japanese language docuemnt published on Nov. 8, 2018).*
(Continued)

*Primary Examiner* — Christopher S Kessler
(74) *Attorney, Agent, or Firm* — Oliff PLC

(57) ABSTRACT

An R-T-B permanent magnet that contains: main-phase grains composed of an $R_2T_{14}B$ compound (where R is a rare earth element, T is a transition metal element, and B is boron); and grain boundaries. R includes Ce. The grain boundaries include multi-grain grain boundaries that are adjacent to three or more main-phase grains. The multi-grain grain boundaries include an R-rich phase, and lamellar or acicular R-T precipitates are present in the R-rich phase.

17 Claims, 6 Drawing Sheets

(51) Int. Cl.

| | |
|---|---|
| ***B22F 3/24*** | (2006.01) |
| ***B22F 9/02*** | (2006.01) |
| ***B22F 9/04*** | (2006.01) |
| ***C22C 38/00*** | (2006.01) |
| ***C22C 38/06*** | (2006.01) |
| ***C22C 38/10*** | (2006.01) |
| ***C22C 38/14*** | (2006.01) |
| ***C22C 38/16*** | (2006.01) |

(52) U.S. Cl.
CPC ....... *B22F 2304/10* (2013.01); *B22F 2998/10* (2013.01); *B22F 2999/00* (2013.01)

(56) References Cited

OTHER PUBLICATIONS

Jun. 13, 2023 International Preliminary Report on Patentability issued in International Patent Application No. PCT/JP2021/041373.

* cited by examiner

R-T-B BASED PERMANENT MAGNET

TECHNICAL FIELD

The present disclosure relates to an R-T-B based permanent magnet.

BACKGROUND

Patent Document 1 discloses an R-T-B based permanent magnet including Ce as R, and also discloses that the R-T-B based permanent magnet includes R-T phases with in a predetermined range. Due to such characteristics, the R-T-B based permanent magnet with improved bending strength can be obtained.

[Patent Document 1] JP Patent Application Laid Open No. 2018-174323

SUMMARY

In general, among rare earth elements, the cost of Ce is low. Hence, it is demanded to produce a rare earth magnet having sufficient magnetic properties, particularly of sufficient coercivity (HcJ), by using Ce.

The object of the present disclosure is to provide a low cost rare earth magnet which includes Ce, and to provide the rare earth magnet with a high HcJ.

In order to attain the above object, the R-T-B based permanent magnet according to the present disclosure includes main phase grains including $R_2T_{14}B$ compound (in which R includes a rare earth element, T includes a transition metal element, and B represents boron) and a grain boundary, wherein Ce is included as R, the grain boundary includes a grain boundary multiple junction surrounded by three or more main phase grains, and the grain boundary multiple junction includes an R-rich phase, and the R-rich phase includes an R-T deposit of a plate shape or a needle shape.

The R-T-B based permanent magnet may include the R-T deposit includes Ce.

A number density of the grain boundary multiple junction including the R-rich phase including the R-T deposit in one cross section of the R-T-B based permanent magnet may be 1000 per $mm^2$ or more.

An amount of Ce to R in the R-T-B based permanent magnet may be within a range of 15 mass % or more and 25 mass % or less.

The R-T-B based permanent magnet may include substantially neither La nor Y.

DETAILED DESCRIPTION

Figure 1A:
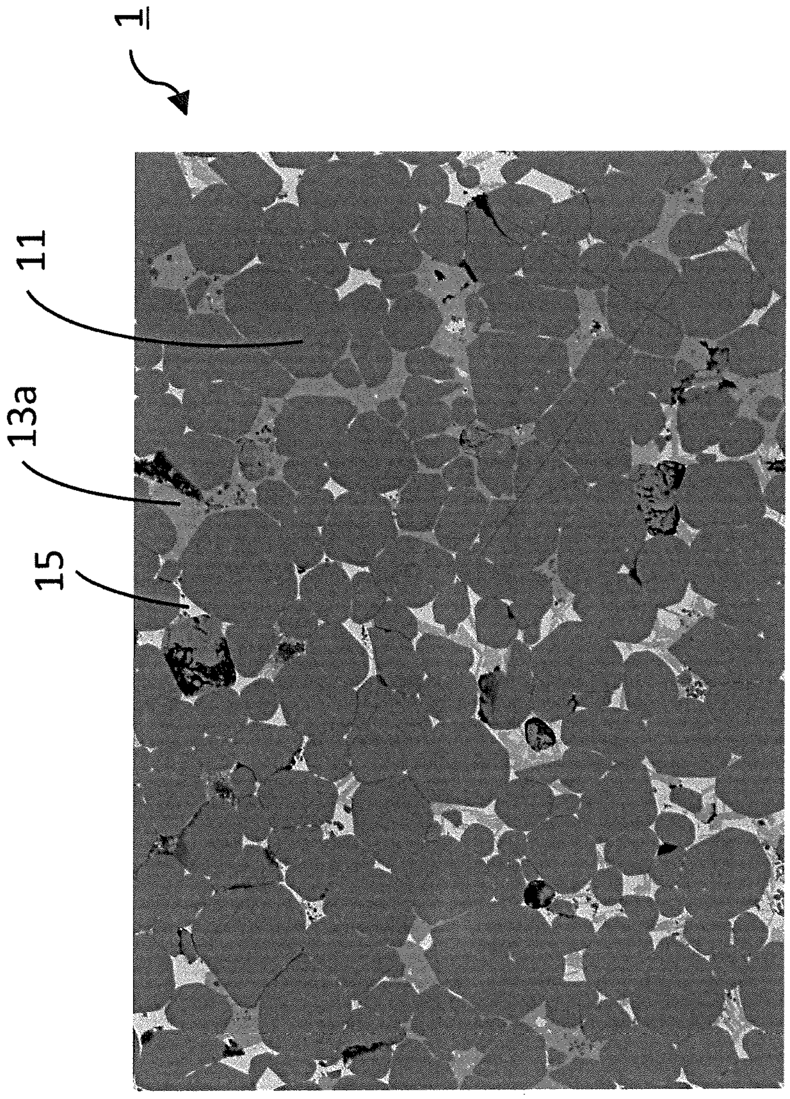
FIG. 1A is a SEM image of Example 1.

In below, the present disclosure is described based on embodiments. An R-T-B based permanent magnet of the present disclosure may be an R-T-B based sintered magnet.

(Composition)

A composition of the R-T-B based sintered magnet is described. R includes a rare earth element. R at least includes cerium (Ce). Since R includes Ce, a material cost is reduced. Further, an R-T deposit of a plate shape or a needle shape described in below tends to be easily included in the R-T-B based sintered magnet. Also, in order to suitably control the material cost of the R-T-B based sintered magnet and magnetic properties of the R-T-B based sintered magnet, R may include at least one selected from neodymium (Nd) and praseodymium (Pr).

T includes a transition metal element. T may include iron group elements (iron (Fe), cobalt (Co), and nickel (Ni)). T may be Fe, or a combination of Fe and Co. B represents boron.

Further, the R-T-B based sintered magnet may include at least one selected from metal elements other than the transition metal elements. For example, at least one selected from aluminum (Al) and gallium (Ga) may be included. Further, carbon (C) may be included as well.

In below, an amount of each element in the R-T-B based sintered magnet is described.

The amount of each element in the R-T-B based sintered magnet is not particularly limited. A total amount of R may be within a range of 30.00 mass % or more and 34.00 mass % or less, or within a range of 32.00 mass % or more and 34.00 mass % or less to 100 mass % of the R-T-B based sintered magnet as a whole. Note that, the amount of each element shown in below shows an amount with respect to 100 mass % of the R-T-B based sintered magnet as a whole, unless mentioned otherwise.

An amount of B may be within a range of 0.70 mass % or more and 0.95 mass % or less, or within a range of 0.80 mass % or more and 0.90 mass % or less.

An amount of Co may be within a range of 0.50 mass % or more and 3.00 mass % or less, or may be within a range of 2.00 mass % or more and 3.00 mass % or less.

The R-T-B based sintered magnet may or may not include Ga. An amount of Ga may be within a range of 0 mass % or more and 0.60 mass % or less, or within a range of 0 mass % or more and 0.10 mass % or less. The smaller the amount of Ga is, the easier it is to improve a production stability of the R-T-B based sintered magnet, hence the amount of Ga may be small.

The R-T-B based sintered magnet may or may not include Al. An amount of Al may be within a range of 0.20 mass % or more and 1.00 mass % or less, or may be within a range of 0.30 mass % or more and 0.90 mass % or less.

The R-T-B based sintered magnet may or may not include copper (Cu) as T. An amount of Cu may be within a range of 0 mass % or more and 0.50 mass % or less, or may be within a range of 0 mass % or more and 0.25 mass % or less.

The R-T-B based sintered magnet may or may not include zirconium (Zr). An amount of Zr may be within a range of 0.10 mass % or more and 1.00 mass % or less, or may be within a range of 0.40 mass % or more and 0.60 mass % or less.

The amount of Ce to R may be within a range of 15 mass % or more and 25 mass % or less. When the amount of R is within the range mentioned in above, an R-T deposit of a plate shape or needle shape described in below tends to be easily included. Also, when the amount of Ce to R is 15 mass % or more, the material cost can be reduced sufficiently.

A total amount of heavy rare earth elements included as R may be within a range of 0 mass % or more and 0.10 mass % or less. The larger the amount of the heavy rare earth elements is, the easier it is for HcJ to increase but the cost will increase. Also, the larger the amount of the heavy rare earth elements is, Br tends to decrease easier. The heavy rare earth elements include, Gd, Tb, Dy, Ho, Er, Tm, Yb, and Lu.

Also, substantially neither yttrium (Y) nor lanthanum (La) may be included. Here, "substantially neither yttrium (Y) nor lanthanum (La) may be included" means that an amount of Y to R and an amount of La to R is 0.5 mass % or less in total. When Y and La are substantially included, it becomes difficult to include the R-T deposit of a plate shape or needle shape described in below, and HcJ tends to decrease easily. When La is included, a corrosion resistance also tends to decrease easily.

The R-T-B based sintered magnet may or may not include C. An amount of C may be within a range of 0 mass % or more and 0.3 mass % or less.

An amount of Fe may be a substantial balance in constituents of the R-T-B based sintered magnet. Here, "the amount of Fe is a substantial balance" means that elements other than the group consisting of R, B, Co, Ga, Al, Cu, Zr, and C is Fe and inevitable impurities. Further, an amount of inevitable impurities may be 0.5 mass % or less (including 0) in total with respect to the R-T-B based sintered magnet.

(Microstructure)

Figure 1B:
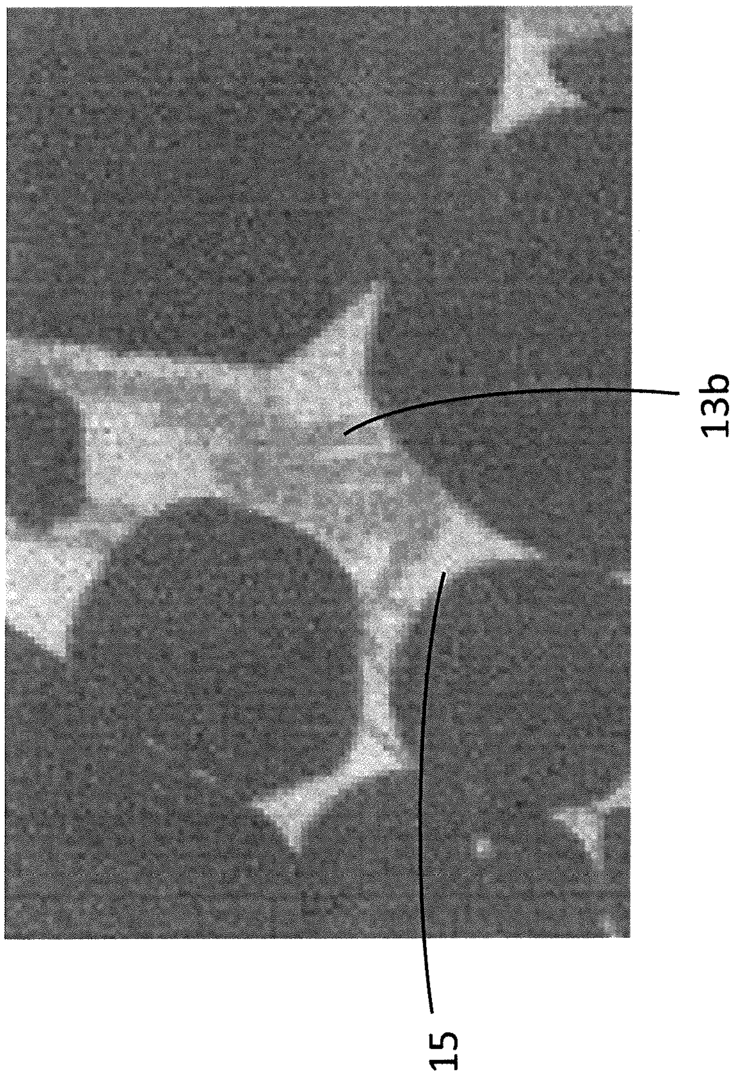
FIG. 1B is a partially enlarged image of FIG. A.

In below, an R-T-B based sintered magnet 1 is described using figures, particularly using FIG. 1A and FIG. 11B. Note that, FIG. 1A is a backscattered electron image obtained by observing a cross section of Example 1 described in below by using a field emission scanning electron microscope (FE-SEM). The backscattered electron image obtained by observation using an FE-SEM may be simply referred to as a SEM image in some cases. FIG. 1B is a partially enlarged image of FIG. A.

When one cross section of the R-T-B based sintered magnet 1 is observed using SEM, as shown in FIG. 1A, a main phase grain 11 and a plurality of types of grain boundary phases which are existing in the grain boundary can be observed. Further, the plurality of types of grain boundary phases have different color shades depending on the compositions and different shapes depending on crystalline types.

For example, using an Energy Dispersive X-ray Spectroscopy (EDS), an Energy Probe Microanalyzer (EPMA), a Transmission Electron Microscope (TEM), or so on which are attached with FE-SEM, point analysis of each grain boundary phase is carried out to identify the composition, thereby the grain boundary phase can be specified.

Further, a crystal structure of each grain boundary phase may be determined using a Transmission Electron Microscope (TEM). By determining the crystalline structure of each grain boundary phase using TEM, the grain boundary phase can be identified further specifically.

As shown in the SEM image of FIG. 1A, the R-T-B based sintered magnet 1 includes the main phase grains 11 and the grain boundary formed between the main phase grains 11. The main phase grains 11 are made of an $R_2T_{14}B$ compound. The $R_2T_{14}B$ compound is a compound having a tetragonal crystalline structure of $R_2T_{14}B$ type. The main phase grain 11 appears in black color in the SEM image. A size of the main phase grain 11 is not particularly limited, and a circle equivalent diameter may be within a range of about 1.0 μm to 10.0 μm. The main phase grain 11 is clearly larger than the R-T deposit 13*b* of a plate shape or needle shape which is described in below.

The grain boundary includes a grain boundary multiple junction and a two grain boundary. The grain boundary multiple junction is a grain boundary surrounded by three or more main phase grains, and the two grain boundary is a grain boundary that exists between adjacent two main phase grains.

The grain boundary includes at least two types of grain boundary phases. In FIG. 1, the grain boundary includes an R-T phase 13*a* and an R-rich phase 15.

The R-T phase 13*a* mainly includes an R-T compound. The R-T compound includes R and T. An amount of R of the R-T phase 13*a* may be within a range of 20.0 at % or more and 40.0 at % or less; and an amount of T may be within a range of 55.0 at % or more and 80.0 at % or less. Further, the R-T phase 13*a* includes the R-T compound so that an amount of elements other than R and T included in the R-T phase 13*a* is 10.0 at % or less in total. Note that, a total amount of R, T and elements other than R and T is an amount which does not consider oxygen (O), C, and nitrogen (N).

The R-rich phase 15 refers to a phase having 40.0 at % or more of the amount of R and having smaller amount of T than the R-T phase 13*a*. The amount of T may be 55.0 at % or less. Note that, the amount of R and T is an amount which does not consider O, C, and N.

The R-rich phase 15 includes an R-T deposit 13*b* of a plate shape or a needle shape. A plate shape or a needle shape refers to a shape that a ratio of longitudinal direction length to a short direction length is 2 or larger in a SEM image, and the short direction length is 100 nm or longer. In below, the R-T deposit having a plate shape or a needle shape may be simply referred as a plate shape R-T deposit. Also, the longitudinal direction length of the plate shape R-T deposit 13*b* is not particularly limited, and it may be within a range of 200 nm or longer and 10000 nm or shorter.

A composition of the plate shape R-T deposit 13*b* is the same as the composition of the R-T compound included in the R-T phase 13*a*.

The condition that the plate shape R-T deposit 13*b* is included in the R-rich phase 15 means that 30.0% or more of the circumference of the plate shape R-T deposit 13*b* is covered in the R-rich phase 15 when observing the SEM image.

As discussed in above, the grain boundary multiple junction included in the R-T-B based sintered magnet 1 includes the R-rich phase 15, and the R-rich phase 15 includes the plate shape R-T deposit 13*b*.

When brightness of the main phase grain 11, brightness of the R-T phase 13*a* and R-T deposit 13*b*, and brightness of the R-rich phase 15 are compared in a SEM image, the main phase grain 11 appears the darkest, and the R-rich phase 15 appears the brightest.

When Ce is used for the R-T-B based sintered magnet, the cost of the magnet can be reduced since the cost of Ce is lower compared to Nd and Pr, but HcJ may be lowered by using Ce. Regarding the R-T-B based sintered magnet using Ce, the present inventors have found that when the plate shape R-T deposit is included in the R-rich phase included in the grain boundary multiple junction, a higher HcJ can be obtained than when the plate shape R-T deposit is not included in the R-rich phase included in the grain boundary multiple junction. The mechanism on how HcJ is improved when the R-rich phase includes the plate shape R-T deposit is not necessarily clear. The present inventors speculate the below described mechanism.

Regarding the R-T-B based sintered magnet including Ce as R, the above-mentioned R-T phase and R-rich phase tend to easily formed in the grain boundary. The R-T phase has a high saturation magnetization. However, when the R-T phase is in contact with the main phase grain, magnetism reverse nucleus is formed at a contact point between the main phase grain and the R-T phase. When the magnetism reverse nucleus is formed, HcJ of the R-T-B based sintered magnet decreases.

When the plate shape R-T deposit is included in the R-rich phase, the plate shape R-T deposit is covered with the R-rich phase. The plate shape R-T deposit covered with the R-rich phase has a high magnetization saturation as similar to the R-T phase. Further, the plate shape R-T deposit covered with the R-rich phase is unlikely to contact the main phase grain. That is, separation of magnetism is facilitated between the main phase grain and the plate shape R-T deposit covered with the R-rich phase, and magnetism reverse nucleus is unlikely to form. As a result, HcJ of the R-T-B based sintered magnet improves.

The plate shape R-T deposit may include Ce. In this case, HcJ tends to improve even easier.

In one cross section of the R-T-B based sintered magnet, a number density of the grain boundary multiple junction including the R-rich phase including the plate shape R-T deposit may be 1000 per $mm^2$ or more. In this case, separation of magnetism is facilitated even more and HcJ tends to improve easily. In below, a grain boundary multiple junction including the R-rich phase including the plate shape R-T deposit may be simply referred as a grain boundary multiple junction including the plate shape R-T deposit.

The number density of the grain boundary multiple junction including the plate shape R-T deposit is calculated by visually observing the SEM image. An area of observation field of the SEM image used for measuring the number density of the grain boundary multiple junction including the plate shape R-T deposit is not particularly limited, and a sufficiently large area is used in order to measure the number density of the grain boundary multiple junction including the plate shape R-T deposit. For example, an area of the observation field may be 0.01 $mm^2$ or larger.

A magnification for the SEM image observation can be a sufficiently high magnification to clearly verify whether the grain boundary multiple junction includes a grain boundary multiple junction including the plate shape R-T deposit. For example, the magnification may be 1000× or more and 10000× or less. Further, the magnification for observation may be adjusted accordingly in order to verify whether the specific grain boundary multiple junction includes a grain boundary multiple junction including the plate shape R-T deposit. For example, FIG. 1B is a SEM image which is obtained by enlarging the specific grain boundary multiple junction included in FIG. A.

The grain boundary may include a phase other than the above-mentioned R-T phase 13*a* and R-rich phase 15. Also, the grain boundary may include a deposit other than the plate shape R-T deposit 13*b*.

(Production Method) In below, an example of a method of producing the R-T-B based sintered magnet is described. The method of producing the R-T-B based sintered magnet includes below described steps.

(a) An alloy preparation step for producing an R-T-B based sintered magnet alloy (raw material alloy).
(b) A pulverization step for pulverizing the raw material alloy and to obtain an alloy powder.
(c) A pressing step for pressing the obtained alloy powder and to obtain a green compact.
(d) A sintering step for sintering the obtained green compact to obtain the R-T-B based sintered magnet.
(e) An aging treatment step for aging the R-T-B based sintered magnet.
(f) A machining step for machining the R-T-B based sintered magnet.
(g) A grain boundary diffusion step for diffusing a heavy rare earth element in the grain boundary of the R-T-B based sintered magnet.
(h) A surface treatment step for surface treating the R-T-B based sintered magnet.

[Alloy Preparation Step]

An R-T-B based sintered magnet alloy is prepared (alloy preparation step). In below, a strip casting method is explained as an example of the alloy preparation step, however, the alloy preparation step is not limited to a strip casting method.

Raw material metals matching the composition of the R-T-B based sintered magnet are prepared, and the raw material metals prepared under vacuumed atmosphere or inert gas atmosphere such as argon (Ar) are melted. Then, by casting the melted raw material metals, a raw material alloy which is a raw material of the R-T-B based sintered magnet is produced. Note that, in below description, a one-alloy method is explained, however, a two-alloy method which obtains the raw material powder by mixing two alloys of a first alloy and a second alloy may be used.

Types of the raw material metals are not particularly limited. For example, rare earth metals, pure iron, pure cobalt, compounds such as ferroboron (FeB), alloys such as rare earth element alloy, and so on may be used. A casting method for casting the raw material metals is not particularly limited. For example, an ingot casting method, a strip casting method, a book mold casting method, a centrifugal casting method, and so on may be mentioned. If needed, a homogenization treatment (solution treatment) may be carried out to the obtained raw material alloy, when solidification segregation is found.

[Pulverization Step]

After the raw material alloy is produced, the raw material alloy is pulverized (pulverization step). The pulverization step may be carried out in a two-step process which includes a coarse pulverization step of pulverizing the alloy to a particle size of about several hundred m to several mm; and a fine pulverization step of finely pulverizing to a particle size of about several m. However, a single-step process consisting solely of a fine pulverization step may be carried out.

(Coarse Pulverization Step)

During the coarse pulverization step, the raw material alloy is coarsely pulverized till the particle size becomes approximately several hundred m to several mm (coarse pulverization step). Thereby, a coarsely pulverized powder of the raw material alloy is obtained. For example, coarse pulverization can be done by first storing hydrogen into the raw material alloy, then dehydrogenating by releasing hydrogen based on the differences of hydrogen stored amount in different phases which causes self-collapsing pulverization (hydrogen storage pulverization). Conditions of the dehydrogenation are not particularly limited, for example, it may be carried out at a temperature within a range of 300 to 650° C. under Ar flow or in vacuum.

The coarse pulverization method is not limited to the above-mentioned hydrogen storage pulverization. For example, coarse pulverization may be carried out using a coarse pulverizer such as a stamp mill, a jaw crusher, a brown mill, and so on under inert gas atmosphere.

In order to obtain the R-T-B based sintered magnet having high magnetic properties, an atmosphere of each step from the pulverization step to the sintering step may be a low oxygen concentration atmosphere. The oxygen concentration is adjusted by controlling atmosphere at each step of the production. If the oxygen concentration at each step of the production is high, the rare earth element in the alloy powder obtained by pulverizing the raw material alloy is oxidized and R oxide is generated. The R oxide is not reduced after the sintering step; hence it is deposited in the grain boundary as R oxide. As a result, coercivity HcJ of the obtained R-T-B based sintered magnet tends to decrease easily. Thus, for example, each step (fine pulverization step, pressing step) may be carried out under the atmosphere having oxygen concentration of 100 ppm or less.

(Fine Pulverization Step)

After coarsely pulverizing the raw material alloy, the obtained coarsely pulverized powder is finely pulverized till the average particle size becomes several m or so (fine pulverization step). Thereby, a finely pulverized powder of raw material alloy can be obtained. D50 of the particles included in the finely pulverized powder is not particularly limited. For example, D50 may be within a range of 1.0 μm or larger and 10.0 μm or smaller.

The fine pulverization is carried out by adjusting conditions of fine pulverization such as pulverization time and so on, and by further pulverizing the powder obtained by coarse pulverization using a fine pulverizer such as a jet mill or so. Below explains a jet mill. A jet mill is a fine pulverizer in which a high-pressure inert gas (for example, He gas, $N_2$ gas, and Ar gas) is released from a narrow nozzle to generate a high-speed gas flow, and this high-speed gas flow accelerates the coarsely pulverized powder of a raw material alloy to collide against each other or collide with a target or a container wall.

When the coarsely pulverized powder of the raw material alloy is finely pulverized, for example, a lubricant such as an organic lubricant or a solid lubricant may be added. As the organic lubricant, oleic amide, lauramide, zinc stearate, and the like may be mentioned. As the solid lubricant, for example, graphite and the like may be mentioned. By adding the lubricant, a finely pulverized powder can be obtained which tends to be easily oriented when magnetic field is applied during the pressing step. Either one of the organic lubricant or the solid lubricant may be used, or both of them may be mixed and used.

[Pressing Step]

The finely pulverized powder is pressed into a desired shape (pressing step). The pressing step is carried out by placing the finely pulverized powder in a mold arranged in magnetic field, and then applying a pressure, thereby the finely pulverized powder is pressed and a green compact is obtained. At this time, by carrying out pressing while applying magnetic field, the finely pulverized powder can be pressed while orienting a crystal axis of the finely pulverized powder in a specific direction. Since the obtained green compact is oriented in a specific direction, the R-T-B based sintered magnet having even higher magnetic anisotropy is obtained. While carrying out pressing, a pressing aid may be added. A type of the pressing aid is not particularly limited. The above-mentioned lubricant may be used.

During pressure application, for example, pressure within a range of 30 MPa or more and 300 MPa or less may be applied during pressure application. For example, as magnetic field applied, magnetic field within a range of 1.0 T or larger and 5.0 T or smaller may be applied. The applied magnetic field is not limited to static magnetic field, and it may also be pulse magnetic field. Also, static magnetic field and pulse magnetic field may be used together.

Note that, as a pressing method, a dry pressing method which directly presses the finely pulverized powder as mentioned in above, or a wet pressing method which presses a slurry having the finely pulverized powder is dispersed in a solvent such as oil and so on may be used.

A shape of the green compact obtained by pressing the finely pulverized powder is not particularly limited, and it can be a shape matching a desired shape of the R-T-B based sintered magnet such as a rectangular parallelepiped shape, a flat plate shape, a columnar shape, a ring shape, a C-like shape, and so on.

[Sintering Step]

The obtained green compact is sintered in vacuum or in inert gas atmosphere to obtain the R-T-B based sintered magnet (sintering step). A sintering temperature needs to be regulated depending on various conditions such as a composition, a pulverization method, an average of the particle size and particle size distribution, and so on. A sintering temperature is not particularly limited, and for example, it may be within a range of 950° C. or higher and 1100° C. or lower. A sintering time is not particularly limited, and it may be within a range of 2 hours or longer and 10 hours or shorter. A sintering atmosphere is not particularly limited. For example, it may be inert gas atmosphere, or may be in vacuum atmosphere of less than 100 Pa.

[Aging Treatment Step]

After sintering the green compact, aging treatment is performed to the R-T-B based sintered magnet (aging treatment step). After sintering, the aging treatment is performed to the obtained R-T-B based sintered magnet at a temperature lower than a temperature during the sintering step.

Conditions of aging treatment may be, an aging temperature within a range of 400° C. or higher and 600° C. or lower, and an aging time within a range of 10 minutes or longer and 300 minutes or shorter. The aging treatment temperature may be within a range of 500° C. or higher and 600° C. or lower. When Ce is included as R, by carrying out the aging treatment under the above-mentioned condition, the grain boundary multiple junction including the plate shape R-T deposit can be formed. Particularly, when the amount of Ce to R is within a range of 15 mass % or more and 25 mass % or less, the grain boundary multiple junction including the plate shape R-T deposit tends to be formed easily. When the amount of Ce to R is larger than 25 mass %, the grain boundary multiple junction including the plate shape R-T deposit is unlikely to form.

When the aging treatment temperature is too low, the plate shape R-T deposit is not formed sufficiently, and the grain boundary multiple junction including the plate shape R-T deposit is not formed. When the aging treatment temperature is too high, a coarse R-T deposit is formed. The coarse R-T deposit does not have a plate shape or a needle shape. Thus, the grain boundary multiple junction including the plate shape R-T deposit is not formed. In either case, HcJ cannot be improved.

Also, when a light rare earth element other than Nd, Pr, and Ce is included, the grain boundary multiple junction is unlikely to form. When La and/or Y is included, the grain boundary multiple junction including the R-T deposit is particularly unlikely to form.

Atmosphere while carrying out the aging treatment is not particularly limited. For example, the atmosphere may be inert gas atmosphere (such as He gas, Ar gas) with pressure higher than atmospheric pressure. Also, the aging treatment step may be carried out after the machining step described in below.

[Machining Step]

The obtained R-T-B based sintered magnet may be machined into a desired shape if needed (machining step). A machining method may be, for example, shape processing such as cutting and grinding, and chamfering such as barrel polishing.

[Grain Boundary Diffusion Step]

Heavy rare earth elements may be further diffused to the grain boundary of the machined R-T-B based sintered magnet (grain boundary diffusion step). A method of grain boundary diffusion is not particularly limited. For example, a compound including the heavy rare earth elements may be adhered on a surface of the R-T-B based sintered permanent magnet by coating, deposition, and the like, and then the heat treatment may be carried out, thereby the grain boundary diffusion may be performed. Also, the R-T-B based sintered magnet may be heat treated under the atmosphere including vapor of heavy rare earth elements. By carrying out the grain boundary diffusion, HcJ of the R-T-B based sintered magnet can be further improved.

[Surface Treatment Step]

The R-T-B based sintered magnet obtained by going through the above-mentioned steps may be further subjected to a surface treatment such as plating, resin coating, an oxidizing treatment, and a chemical treatment and so on (surface treatment step). Thereby, corrosion resistance can be further improved.

Note that, in the above-mentioned production method, the machining step, the grain boundary diffusion step, and the surface treatment step are performed, however, these steps do not necessarily have to be carried out.

The R-T-B based sintered magnet obtained as described in above becomes an R-T-B based sintered magnet having a good HcJ while including Ce.

The present disclosure is not limited to the above-mentioned embodiment, and various modifications may be applied within a scope of the present disclosure. For example, the permanent magnet according to the present disclosure may be produced using a hot forming method or a hot working method. That is, as long as the grain boundary multiple junction including the plate shape R-T deposit and Ce is formed, the permanent magnet according to the present disclosure may be a permanent magnet other than a sintered magnet.

The R-T-B based permanent magnet of the present disclosure can be used as a general R-T-B based permanent magnet. For example, it can be used as a rotating machine for automobile and so on.

EXAMPLES

Hereinbelow, the present disclosure is described in detail using examples, however, the present disclosure is not limited thereto.

(Alloy Preparation Step)

As raw material alloys, alloys A to H having compositions shown Table 1 were prepared. Note that, TRE refers to a total amount of rare earth elements. An amount of the rare earth elements which are not shown in Table 1 was less than 0.01 mass % in total.

First, raw material metals including predetermined elements were prepared. As the raw material metals, Nd, Pr, Ce, Y, La, Fe, Co, FeB, Al, Cu Zr, and Ga each having purity of 99.9% were prepared.

Next, these raw material metals were weighed so as to obtain the alloys having the compositions shown in Table 1, then thin plate shape raw material alloys having compositions shown in Table 1 were prepared using a strip casting method. Then, for each sample, an alloy indicated in Table 2 was selected as the raw material alloy.

(Pulverization Step)

The raw material alloy obtained after the alloy preparation step was pulverized, and an alloy powder was obtained. The raw material alloy was pulverized in two steps of a coarse pulverization and a fine pulverization. The coarse pulverization was carried out using hydrogen storage pulverization. After storing hydrogen in the raw material alloy at room temperature, dehydrogenation was carried out while flowing Ar at 600° C. for 5 hours. By carrying out coarse pulverization, an alloy powder having particle sizes within a range of several hundred m to several mm was obtained.

The fine pulverization was carried out under high pressure nitrogen gas atmosphere by adding 0.1 parts by mass of oleic amide as a lubricant to 100 parts by weight of the alloy powder obtained by coarse pulverization, then these were mixed using a jet mill to obtain a mixed powder. Fine pulverization was carried out until D50 of the alloy powder was about 3.5 μm or so.

Pressing Step)

The obtained mixed powder by the pulverization step was pressed in magnetic field to obtain a green compact. After the mixed powder is placed in a mold arranged in electromagnets, pressing was carried out by applying pressure while also applying magnetic field using electromagnets. Specifically, the mixed powder was pressed by applying pressure of 110 MPa in magnetic field of 2.2 T. A direction of the magnetic field application was perpendicular to a direction of pressure application.

(Sintering Step)

The obtained green compact was sintered to obtain a sintered body. A sintering temperature was 1000° C. and a sintering time was 4 hours, thereby the sintered body was obtained. Sintering was carried out in a vacuum atmosphere.

(Aging Treatment Step)

The obtained sintered body was subject to an aging treatment to obtain an R-T-B based sintered magnet. The aging treatment was carried out at an aging temperature and an aging time shown in Table 2. Atmosphere while carrying out aging treatment was Ar atmosphere.

(Evaluation)

Compositional analysis was carried out using a fluorescence X-ray analysis, an inductively coupled plasma emission spectroscopic analysis (ICP analysis), and a gas analysis to verify that the composition of the obtained R-T-B based sintered magnet at the end of each example and each comparative example had the same composition as the raw material alloy.

The magnetic properties of the R-T-B based sintered magnet formed from the raw material alloy of each example and comparative example was measured using a BH tracer. Specifically, HcJ was measured at room temperature. Results are shown in Table 2. HcJ of 1150 kA/m or larger was considered good, and 1300 kA/m or larger was considered even better.

The plate shape R-T deposit was observed using a below described method.

First, the R-T-B based sintered magnet was embedded in an epoxy-based resin. Then, the R-T-B based sintered magnet was cut, and the obtained cross section was polished. For polishing, a commercially available abrasive paper was used. Specifically, plurality of types of commercially available abrasive papers of Nos. 180 to 2000 were prepared. Further, starting from abrasive papers of the lower numbers, the cross section of the R-T-B based sintered magnet was polished. Then at the end, buff and diamond abrasive grains were used for polishing. Note that, liquid such as water and so on was not used for polishing, in order to avoid corrosion of components included in the grain boundary.

The cross section of the obtained sintered body was subject to an ion milling treatment, and influence such as an oxide layer, a nitride layer, and so on at the outermost surface were removed. Next, cross section of the sintered body was observed using a FE-SEM. The observation magnification was 1000×, and an area of the observation field was 0.013 $mm^2$. Based on the contrasts on the SEM image obtained from observation, the presence of main phase grains and grain boundaries were confirmed, and also the presence of a plurality of types of grain boundary phases in the grain boundary (grain boundary multiple junction) was confirmed. Also, by carrying out point analysis of the grain boundary phases appropriately using EDS installed to FE-SEM, it was confirmed that an R-rich phase and an R-T phase were included in the grain boundary. Further, it was confirmed that the R-T phase included Ce. Note that, point analysis analyzed the elements which were intentionally added while producing the raw material alloy, that is, the amounts of the elements shown in Table 1 were analyzed.

Figure 2A:
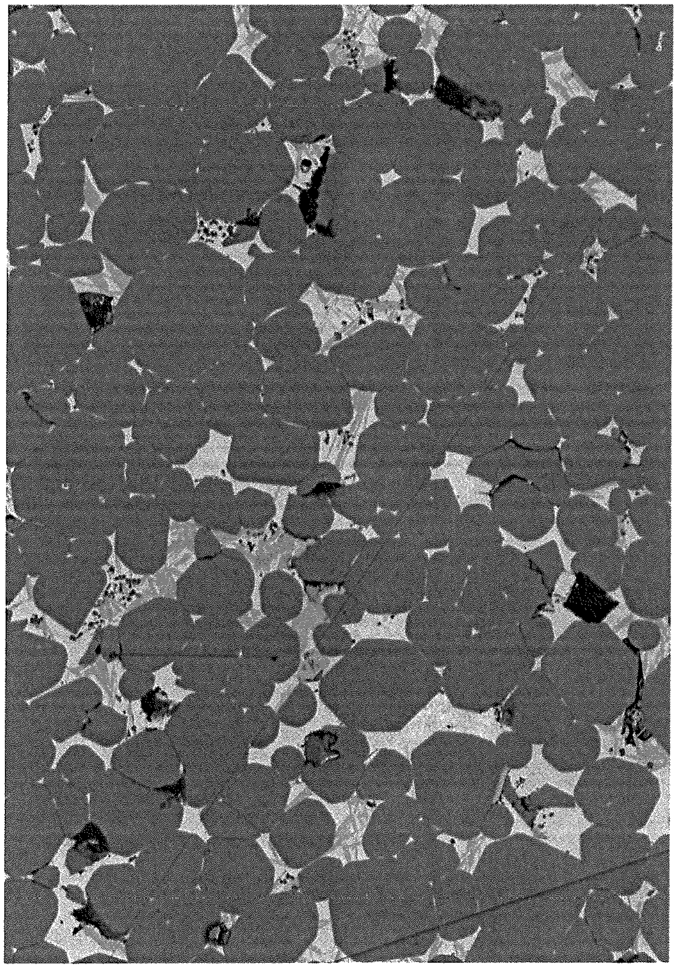
FIG. 2A is a SEM image of Example 2.
Figure 2B:
FIG. 2B is a partially enlarged image of FIG. 2A.
Figure 3:
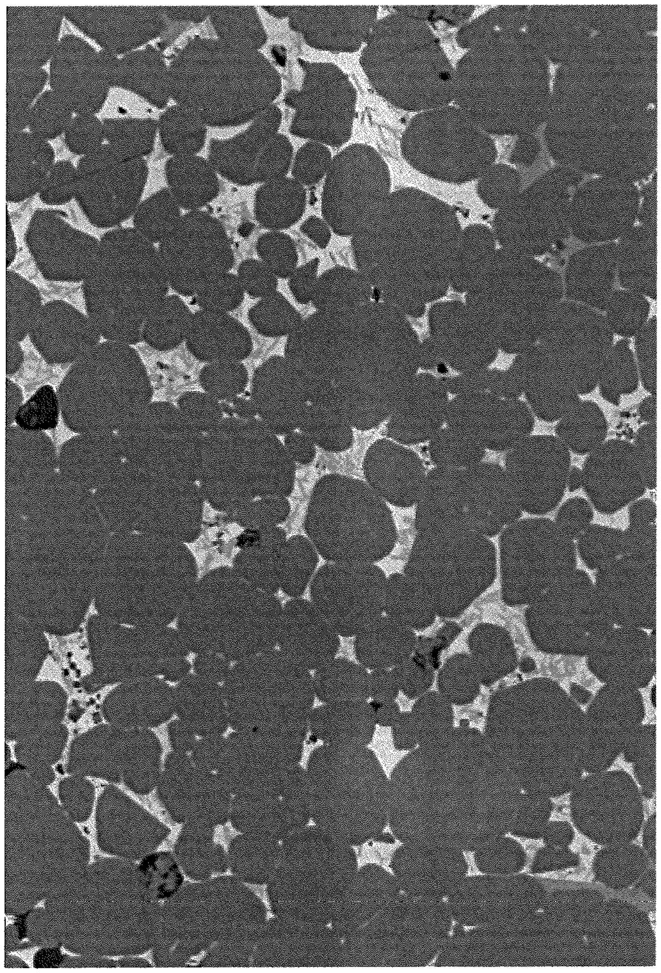
FIG. 3 is a SEM image of Example 5.
Figure 4:
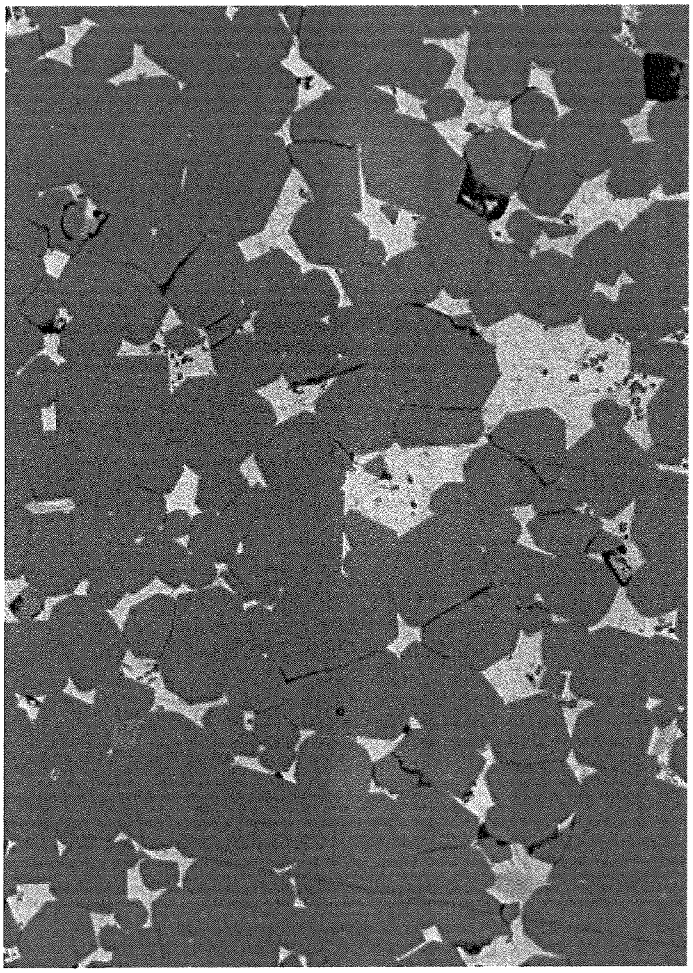
FIG. 4 is a SEM image of Comparative example 1.

Further, from the obtained SEM image, the number of the grain boundary multiple junction including the plate shape R-T deposit was counted. Then, a number density of the grain boundary multiple junction including the plate shape R-T deposit was calculated. Results are shown in Table 2. Note that, FIG. 1A is a SEM image of Example 1, FIG. 2A is a SEM image of Example 2, FIG. 3 is a SEM image of Example 5, and FIG. 4 is a SEM image of Comparative example 1. Also, FIG. 1B is a partially enlarged SEM image of FIG. A, and FIG. 2B is a partially enlarged SEM image of FIG. 2A. Also, it was confirmed that in all of Examples, the plate shape R-T deposit included Ce.

According to Table 2, among Examples 1 to 4 and Comparative example 1, which were examples and comparative exampled carried out under the same conditions except for the aging treatment temperature and the aging treatment time, it was confirmed that the R-T-B based sintered magnets included the grain boundary multiple junction including the plate shape R-T deposit except for Comparative example 1 having the aging treatment temperature of 900° C. which was considered too high. Further, the R-T-B based sintered magnets of Examples 1 to 4 had higher HcJ compared to that of the R-T-B based sintered magnet of Comparative example 1. Further, Examples 1 to 3 of which the aging treatment temperatures were within a range of 500° C. to 600° C. had more grain boundary multiple junctions including the R-rich phase including the plate shape R-T deposit and had a higher HcJ compared to Example 4 of which the aging treatment temperature was 400° C.

Example 5 was an example that part of Fe of Example 1 was replaced with Ga. Example 6 was an example that part of Fe of Example 3 was replaced with Ga. Example 5 of which the aging treatment temperature was 500° C. had more grain boundary multiple junctions including the R-rich phase including the R-T deposit compared to Example 1. However, Example 6 of which the aging treatment temperature was 600° C. had less grain boundary multiple junctions

TABLE 1

| | Unit:mass % | | | | | | | | | | | | | | | |
|---|---|---|---|---|---|---|---|---|---|---|---|---|---|---|---|---|
| Alloy | Nd | Pr | Ce | Y | La | B | Al | Co | Cu | Ga | Zr | Fe | Nd + Pr | TRE | Ce/TRE | Y/TRE | La/TRE |
| A | 21.18 | 4.34 | 6.66 | 0.00 | 0.00 | 0.83 | 0.50 | 2.00 | 0.30 | 0.00 | 0.50 | 63.69 | 25.52 | 32.18 | 20.70 | 0.00 | 0.00 |
| B | 21.18 | 4.34 | 6.66 | 0.00 | 0.00 | 0.83 | 0.50 | 2.00 | 0.30 | 0.60 | 0.50 | 63.09 | 25.52 | 32.18 | 20.70 | 0.00 | 0.00 |
| C | 18.36 | 0.00 | 9.11 | 5.00 | 0.00 | 0.86 | 0.22 | 0.53 | 0.07 | 0.00 | 0.15 | 65.70 | 18.36 | 32.48 | 28.06 | 15.40 | 0.00 |
| D | 18.44 | 0.85 | 7.87 | 0.00 | 3.74 | 0.91 | 0.22 | 0.52 | 0.06 | 0.00 | 0.13 | 67.27 | 19.29 | 30.90 | 25.47 | 0.00 | 12.11 |
| E | 17.03 | 0.00 | 16.82 | 0.00 | 0.00 | 0.83 | 0.24 | 0.50 | 0.07 | 0.00 | 0.14 | 64.37 | 17.03 | 33.85 | 49.68 | 0.00 | 0.00 |
| F | 20.58 | 0.00 | 13.55 | 0.00 | 0.00 | 0.83 | 0.29 | 0.49 | 0.08 | 0.00 | 0.14 | 64.04 | 20.58 | 34.13 | 39.70 | 0.00 | 0.00 |
| G | 20.12 | 4.12 | 7.99 | 0.00 | 0.00 | 0.83 | 0.50 | 2.00 | 0.30 | 0.60 | 0.50 | 63.03 | 24.24 | 32.24 | 24.79 | 0.00 | 0.00 |
| H | 22.50 | 4.61 | 5.00 | 0.00 | 0.00 | 0.83 | 0.50 | 2.00 | 0.30 | 0.60 | 0.50 | 63.16 | 27.12 | 32.11 | 15.56 | 0.00 | 0.00 |

TABLE 2

| Sample | Alloy | Aging treatment tempetature [° C.] | Aging treatment time [min] | HcJ [kA/m] | Presence of plate shape R-T deposit | Grain boundary multiple junction including plate shape R-T deposit: Number observed in observation field | Grain boundary multiple junction including plate shape R-T deposit: Number density [per $mm^2$] |
|---|---|---|---|---|---|---|---|
| Example 1 | A | 500 | 90 | 1425 | Obvered | 147 | 11907 |
| Example 2 | A | 550 | 90 | 1445 | Obvered | 112 | 9072 |
| Example 3 | A | 600 | 90 | 1375 | Obvered | 29 | 2349 |
| Example 4 | A | 400 | 90 | 1185 | Obvered | 5 | 405 |
| Comparative example 1 | A | 900 | 60 | 1067 | Not observed | 0 | 0 |
| Example 5 | B | 500 | 90 | 1435 | Obvered | 253 | 20493 |
| Example 6 | B | 600 | 90 | 1321 | Obvered | 1 | 81 |
| Comparative example 2 | C | 600 | 60 | 924 | Not observed | 0 | 0 |
| Comparative example 3 | D | 600 | 60 | 640 | Not observed | 0 | 0 |
| Comparative example 4 | E | 530 | 60 | 885 | Not observed | 0 | 0 |
| Comparative example 5 | F | 530 | 60 | 1101 | Not observed | 0 | 0 |
| Example 7 | G | 600 | 90 | 1380 | Obvered | 27 | 2187 |
| Example 8 | H | 600 | 90 | 1458 | Obvered | 13 | 1053 |

including the R-rich phase including the R-T deposit compared to Example 3. Further, Example 5 had higher HcJ compared to Example 6.

As discussed in above, it was confirmed that the number density of the grain boundary multiple junctions including the R-rich phase including the plate shape R-T deposit tended to change easily along with the change in the aging treatment temperature when Ga was included. That is, when Ga was included, it was confirmed that a production stability tended to decline easily.

Comparative example 2 had a composition which included Y. Comparative example 3 had a composition which included La. Comparative example 4 had a composition in which an amount of Ce to R was 50%. Comparative example 5 had a composition in which an amount of Ce to R was 40%. Other conditions of production were the same as Example 1. Comparative examples 2 to 5 did not show the grain boundary multiple junction including the R-rich phase including the plate shape R-T deposit, and also HcJ was decreased.

Example 7 had a composition in which an amount of Ce to R was 25% and Ga was included. Example 8 had a composition in which an amount of Ce to R was 15% and Ga was included. Other conditions of production were the same as Example 1. Examples 7 and 8 had a grain boundary multiple junction including the R-rich phase including the plate shape R-T deposit, and HcJ was good.

REFERENCE SIGNS LIST

1 . . . R-T-B based sintered magnet
11 . . . Main phase grain
13*a* . . . R-T phase
13*b* . . . Plate shape or needle shape R-T deposit (plate shape R-T deposit)
15 . . . R-rich phase

What is claimed is:

1. An R-T-B based permanent magnet comprising main phase grains including an $R_2T_{14}B$ (compound, in which R includes a rare earth element, T includes a transition metal element, and B represents) boron, and a grain boundary, wherein R at least includes Ce, the grain boundary includes a grain boundary multiple junction surrounded by three or more main phase grains, and the grain boundary multiple junction includes an R-rich phase, the R-rich phase includes an R-T deposit of a plate shape or a needle shape, and 30.0% or more of the circumference of the R-T deposit is covered in the R-rich phase in one cross-section of the R-T-B based permanent magnet.

2. The R-T-B based permanent magnet according to claim 1, wherein the R-T deposit includes Ce.

3. The R-T-B based permanent magnet according to claim 1, wherein a number density of the grain boundary multiple junction including the R-rich phase including the R-T deposit in one cross section of the R-T-B based permanent magnet is 1000 per $mm^2$ or more.

4. The R-T-B based permanent magnetic according to claim 1, wherein an amount of Ce to R in the R-T-B based permanent magnet is within a range of 15 mass % or more and 25 mass % or less.

5. The R-T-B based permanent magnet according to claim 1, wherein the R-T-B based permanent magnet include substantially neither La nor Y.

6. The R-T-B based permanent magnetic according to claim 1, wherein the R-T-B based permanent magnet includes at least one selected from Al and Ga.

7. The R-T-B based permanent magnetic according to claim 6, wherein the R-T-B based permanent magnet includes carbon.

8. The R-T-B based permanent magnetic according to claim 1, wherein a total amount of R is within a range of 30.00 mass % or more and 34.00 mass % or less with respect to 100 mass % of the R-T-B based permanent magnet as a whole.

9. The R-T-B based permanent magnetic according to claim 1, wherein an amount of B is within a range of 0.70 mass % or more and 0.95 mass % or less with respect to 100 mass % of the R-T-B based permanent magnet as a whole.

10. The R-T-B based permanent magnetic according to claim 1, wherein an amount of Co is within a range of 0.50 mass % or more and 3.00 mass % or less with respect to 100 mass % of the R-T-B based permanent magnet as a whole.

11. The R-T-B based permanent magnetic according to claim 1, wherein an amount of Ga is within a range of 0 mass % or more and 0.60 mass % or less with respect to 100 mass % of the R-T-B based permanent magnet as a whole.

12. The R-T-B based permanent magnetic according to claim 1, wherein an amount of Al is within a range of 0.20 mass % or more and 1.00 mass % or less with respect to 100 mass % of the R-T-B based permanent magnet as a whole.

13. The R-T-B based permanent magnetic according to claim 1, wherein an amount of Cu is within a range of 0 mass % or more and 0.50 mass % or less with respect to 100 mass % of the R-T-B based permanent magnet as a whole.

14. The R-T-B based permanent magnetic according to claim 1, wherein an amount of Zr is within a range of 0.10 mass % or more and 1.00 mass % or less with respect to 100 mass % of the R-T-B based permanent magnet as a whole.

15. The R-T-B based permanent magnetic according to claim 1, wherein a total amount of heavy rare earth elements included as R is within a range of 0 mass % or more and 0.10 mass % or less with respect to 100 mass % of the R-T-B based permanent magnet as a whole.

16. The R-T-B based permanent magnetic according to claim 1, wherein an amount of C may be within a range of 0 mass % or more and 0.3 mass % or less with respect to 100 mass % of the R-T-B based permanent magnet as a whole.

17. The R-T-B based permanent magnetic according to claim 1, wherein elements other than the group consisting of R, B, Co, Ga, Al, Cu, Zr, and C is Fe and inevitable impurities, and an amount of the inevitable impurities is 0 or more and 0.5 mass % or less with respect to 100 mass % of the R-T-B based permanent magnet as a whole.

* * * * *